(12) United States Patent
Bonnin et al.

(10) Patent No.: US 7,837,324 B2
(45) Date of Patent: Nov. 23, 2010

(54) OPHTHALMIC LENS COMPRISING A LAYER HAVING A VARIABLE REFRACTIVE INDEX

(75) Inventors: Thierry Bonnin, Charenton-le-Pont (FR); Cecile Petignaud, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 381 days.

(21) Appl. No.: 11/911,693

(22) PCT Filed: Apr. 18, 2006

(86) PCT No.: PCT/FR2006/000850

§ 371 (c)(1),
(2), (4) Date: Oct. 16, 2007

(87) PCT Pub. No.: WO2006/111652

PCT Pub. Date: Oct. 26, 2006

(65) Prior Publication Data

US 2008/0198325 A1    Aug. 21, 2008

(30) Foreign Application Priority Data

Apr. 19, 2005 (FR) ................................. 05 03917

(51) Int. Cl.
*G02C 7/06* (2006.01)
(52) U.S. Cl. ...................................... 351/169; 351/159
(58) Field of Classification Search ................ 351/159, 351/168, 169
See application file for complete search history.

(56) References Cited

U.S. PATENT DOCUMENTS

| | | | |
|---|---|---|---|
| 4,944,584 A * | 7/1990 | Maeda et al. | ............... 351/172 |
| 5,148,205 A | 9/1992 | Guilino et al. | |
| 5,270,745 A | 12/1993 | Pedrono | |
| 5,488,442 A | 1/1996 | Harsigny et al. | |
| 5,861,934 A * | 1/1999 | Blum et al. | ................. 351/169 |
| 5,949,519 A | 9/1999 | Le Saux et al. | |
| 6,220,705 B1 | 4/2001 | Francois et al. | |
| 6,309,803 B1 | 10/2001 | Coudray et al. | |
| 6,813,082 B2 * | 11/2004 | Bruns | ......................... 359/589 |
| 7,006,745 B2 | 2/2006 | Etienne | |

(Continued)

FOREIGN PATENT DOCUMENTS

EP         0994375         4/2000

(Continued)

*Primary Examiner*—Joseph Martinez
*Assistant Examiner*—James R Greece
(74) *Attorney, Agent, or Firm*—Occhiuti Rohlicek & Tsao LLP

(57) ABSTRACT

An ophthalmic lens (10) comprises an optical component (1) and a layer (2) placed on a face of the optical component (1a). The layer (2) has a variable refractive index and is structured so that a second order derivative of the index with regard to a linear spatial coordinate along the face of the optical component (1a) is greater than a fixed threshold. The layer (2) makes it possible to alter the optical power and astigmatism of the lens (10) with regard to corresponding values only relative to the optical component (1). In the event that the ophthalmic lens (10) is a progressive lens, the layer (2) makes it possible to change an addition, a length of progression and/or a design of the progressive lens.

19 Claims, 10 Drawing Sheets

U.S. PATENT DOCUMENTS

2002/0080464 A1 6/2002 Bruns
2003/0003295 A1 1/2003 Dreher et al.

FOREIGN PATENT DOCUMENTS

| FR | 2769999 | 10/1997 |
| FR | 2770000 | 10/1997 |
| WO | WO2004/015481 | 2/2001 |
| WO | WO03/035377 | 5/2003 |
| WO | WO2004/034095 | 4/2004 |

* cited by examiner

Optical Power

Astigmatism

OPHTHALMIC LENS COMPRISING A LAYER HAVING A VARIABLE REFRACTIVE INDEX

CROSS-REFERENCE TO RELATED APPLICATION

This application is being filed as a U.S. National Stage under 35 U.S.C. 371 of International Application No. PCT/FR2006/000850, filed on Apr. 18, 2006, which claims the benefit of French Application No. 05/03,917, filed Apr. 19, 2005, the contents of which is hereby incorporated by reference in its entirety.

The present invention relates to an ophthalmic lens comprising at least one variable refractive index layer, and also to prescription spectacles comprising such a lens.

An ophthalmic lens usually provides a visual correction in accordance with a prescription established for the wearer of this lens. The prescription indicates in particular an optical power value, an astigmatism value and an astigmatism axis, these being determined so as to correct the distance vision of the wearer. These values are generally obtained by selecting a lens of appropriate refractive index and by giving the front and rear faces of the lens suitable shapes.

For a progressive lens, at least one of the two faces of the lens has a particular shape, with variations in mean sphere between the upper portion and the lower portion of the lens, resulting in optical power variations perceived by the wearer when he changes his line of sight.

As is known, at each point on one face of the lens, the mean sphere is determined by the mean curvature of this face and the cylinder is determined by the difference between the two curvatures of a torus tangential to the face of the lens. What is known as the "meridian" line is the curve on the face of the lens along which the optical power varies, which line is formed by the preferential set of points on the lens that determines the path that an eye should normally follow in order to pass from the distance vision position to the near vision position. The meridian line is defined during the design of a progressive lens. The term "optical design" refers to variations in the optical power and in the astigmatism of the lens in the field of view away from the meridian line. The term "surface design" refers to variations in the sphere and in the cylinder of the progressive face of the lens away from the meridian line. In particular, the optical addition, which is the difference in optical power between two points on the lens that are dedicated to near vision and to distance vision respectively, must also correspond to the value prescribed for a long-sighted person. In the same way, the surface addition is the difference in mean sphere between the point dedicated to near vision and the point dedicated to distance vision.

The mean sphere progression function of a lens face involves nonzero cylinder values in regions of the lens lying away from the meridian line, these being called "lateral" regions of the lens face.

Typically, a progressive lens is manufactured in two successive steps. The first step consists in manufacturing a semifinished lens, the front face of which has variations in mean sphere and in cylinder that are initially defined so as to correspond to a specified design. This step is carried out in the factory, for example by compressor molding or injection molding. The semifinished lenses are divided into several models, which may differ in particular by the mean sphere at the distance vision point of the lens, by the distribution of the mean sphere and cylinder of the front face on the meridian line or away from said line, or by the addition. The distance between the distance and near vision points, the respective widths of the regions of the lens corresponding to distance vision and to near vision, the refractive index of the transparent material of which the semifinished lens is made, etc. may also differ from one model to another. Each combination of these characteristics corresponds to a different semifinished lens model.

The second step is carried out in laboratories located between the factory and retail sales center within the distribution chain for ophthalmic lenses. It consists in subsequently machining the rear face of each lens, in the form of a spherical, toric or more complex surface, in order for the lens to correspond to the wearer's prescription.

At the present time, there is a trend to customize ophthalmic lenses according to each wearer. This customization may be of various types. For example, it may consist of a fine adjustment in the optical power and/or the astigmatism of each lens, below the optical power and/or astigmatism minimum difference existing between two semifinished lenses.

In the case of a progressive lens, the lens design may also be customized, for example according to additional characteristics of the wearer other than the usual prescription characteristics. Such additional characteristics may relate in particular to the position on the wearer's head and the position of his eyes for a distance vision situation and a near vision situation respectively. The progressive lens may then be customized so that the distance vision region and the near vision region are located at suitable places on the lens with respect to the positions of the wearer's head and eyes, and have suitable widths relative to the horizontal movements of his eyes.

In the organization of ophthalmic lens manufacture described above, such lens customization requires an increase in the number of semifinished lens models. The series of semifinished lenses of each model that are manufactured in the factory are therefore shorter, for a larger number of series, and the unit cost price of each lens is higher. Furthermore, this results in complex stock management in laboratories, since the latter must have reserves for a large number of semifinished lens models.

To avoid such an increase in number of semifinished lens models, a novel organization of the manufacturing chain for lenses has been proposed for progressive lenses. In this novel organization, the design of the progressive lens is provided by the rear face of the lens. The semifinished lenses then possess a spherical front face, or one that is less complex than an entirely progressive design, and the rear face is machined subsequently, in accordance with the prescription and/or the design that is tailored to the individual characteristics determined for each wearer. Such an organization is particularly flexible, given that any individual characteristic of the wearer is no longer involved in the selection of the semifinished lens model. In particular, a smaller number of semifinished lens models is sufficient to obtain all the finished lens configurations.

However, in this case, the rear face of the lens possesses a complex shape. This is because the design and the visual correction together result in this form. Subsequent machining of the rear face of the semifinished lens means that laboratories have to be equipped with machines capable of producing such shapes. Such machines, which correspond to what is called the "free form" process, are themselves complex, and therefore expensive. For these reasons, the subsequent machining of the rear faces of the lenses must be grouped together in a small number of specialized laboratories, thereby going counter to moving the customization of the lenses downstream in the manufacturing and distribution chain.

An object of the present invention therefore consists in combining flexible manufacture and distribution of ophthalmic lenses with the possibility of customizing each lens according to at least one individual characteristic of the wearer.

To do this, the invention proposes an ophthalmic lens comprising:

- an optical base component substantially transparent for at least one wavelength of visible light; and
- at least one layer placed on a face of the optical base component, said layer being substantially transparent and having a variable refractive index at said wavelength, in which the layer is structured so that at least one second-order derivative of the variable refractive index with respect to a linear spatial coordinate along the face of the optical base component, expressed in millimeters (mm), is greater than $10^{-4}$ mm$^{-1}$/e, in absolute value and at least one point on said face. In the expression for this value limit, and also throughout the following text, e is the thickness of the variable refractive index layer expressed in millimeters.

Furthermore, the variation in refractive index of the layer has no symmetry of revolution. In other words, the variation in the refractive index of the layer is complex, so that the layer makes it possible to simplify the optical base component although the ophthalmic lens possesses a complex optical function. In particular, the shape of at least one of the faces of the optical base component may be simplified, by producing part of the optical function of the ophthalmic lens by means of the variable refractive index layer. For example, a progressive ophthalmic lens may be obtained from an optical base component that has spherical or sphero-toric faces, using a layer having suitable index variations.

When variations in the refractive index of a layer placed on an optical base component are produced according to the invention, the number of separate models of optical base components that are needed to meet the ophthalmic correction requirements of a population may be reduced. This is because such variations in the refractive index of the layer modify certain optical characteristics of the lens, relative to a lens consisting only of the optical base component. The modified characteristics may for example be the optical power and/or the astigmatism of the ophthalmic lens. In the case of a progressive lens, the modified characteristics may also relate in particular to the addition, the progression length and/or the design of the progressive lens.

In a first way of implementing the invention in the ophthalmic lens manufacturing and distribution chain, the lens comprising the optical base component and the variable refractive index layer is produced in the factory in the form of a semifinished lens. The refractive index of the layer is subsequently adjusted according to measurements made on a wearer of the lens, downstream in the ophthalmic lens manufacturing and distribution chain. For example, the variable refractive index layer may be used to obtain a correction more finely adapted to the ametropia and/or behavior of the wearer, and/or to any characteristic of the wearer that it is desired to take into account in designing the lens in order to obtain the optimum correction. For a progressive lens, the variable refractive index layer may also be used to customize the lens according to physical and behavioral characteristics of the wearer. Such characteristics may be evaluated or measured on the wearer in a retail lens sales outlet, which are then communicated to a laboratory that produces the appropriate variations in the refractive index of the layer.

In a second way of implementing the invention in the ophthalmic lens manufacturing and distribution chain, the semifinished lens produced in the factory includes variations in the refractive index of the layer placed on the optical base component. In other words, the refractive index variations of the layer are produced in the factory, that is to say upstream in the ophthalmic lens manufacturing chain. A large number of semifinished lens models may thus be obtained from a small number of optical base component models. Customization of each ophthalmic lens may also be carried out, for example by machining a face of the lens that does not bear the layer.

The variations in the refractive index of the layer may be produced in various ways. For example, the layer may consist initially of an active material, when it is formed on the optical base component, and then the refractive index of the layer is modified using an appropriate process. When the layer consists of a photosensitive material, the variations in the refractive index may be produced by photowriting. Such a process makes it very easy to produce in succession lenses provided with layers having different refractive index variations.

Advantageously, at least one second-order derivative of the variable refractive index with respect to a linear spatial coordinate along the face of the optical component, expressed in millimeters, is greater than $2 \times 10^{-4}$ mm$^{-1}$/e. The number of optical base component models that is sufficient to meet all the types and degrees of ametrophia correction is therefore further reduced.

The maximum variations in the refractive index of the layer that can be used within the context of the invention depend on the active material employed. For the lenses produced by the inventors, each second-order derivative of the variable refractive index with respect to a linear spatial coordinate along the face of the optical component, expressed in millimeters, is less than 0.1 mm$^{-1}$/e.

Within the context of the present invention, any prismatic effect may be superposed on the modifications of the optical characteristics of the ophthalmic lens that result from the variations in at least one of the second-order derivatives of the refractive index of the layer. Such a prismatic effect may be obtained in particular by adding a component that has a uniform variation in the refractive index of the layer as a function of a linear spatial coordinate along the face of the optical component. Given that it is uniform, such a refractive index variation component does not modify the second-order derivatives of the refractive index of the layer that are considered in the invention.

Furthermore, the refractive index of the layer is assumed to be substantially constant along the thickness direction of the layer, perpendicular to the face of the optical component. All the limits in the variation of the refractive index used to define the invention, including those that relate to the second-order derivatives of the refractive index, are expressed in the form of a quotient relative to the thickness e of the layer. This is because the modifications in the optical characteristics of the lens that result from the variations in the refractive index of the layer are substantially proportional to the thickness of the layer. In particular, a layer of fixed thickness having specified refractive index variations is substantially equivalent to a layer of twice the thickness having refractive index variations of half the magnitude, with respect to the optical characteristics of the layer.

Preferably, the thickness e of the variable refractive index layer is substantially constant between different points on the face of the optical base component. This thickness may for example be between 0.1 and 1.0 mm. Such a layer may be easily formed on the optical component using a known active material. Furthermore, the optical characteristics of the ophthalmic lens may be modified to a sufficient extent.

The variable refractive index layer may be placed on the front face or on the rear face of the optical component, under the conditions of use of the ophthalmic lens by a wearer. Optionally, the lens may furthermore include another optical component substantially transparent at said wavelength, placed on the opposite side of the variable refractive index layer from the optical base component. The layer is then gripped between the two optical components in such a way that it is protected from being accidentally scratched.

According to a preferred embodiment of the invention, the refractive index of the layer varies progressively along the face of the optical base component in such a way that the wearer of the lens perceives no disruption on scanning his field of vision, by rotating his eye. The inventors have determined that any irregularity is imperceptible during such a scan where the layer is structured so that, for each second-order derivative of the variable refractive index with respect to a linear spatial coordinate along the face of the optical component, expressed in millimeters, and for the mixed second-order derivative of the variable refractive index with respect to two of these coordinates, respective values of said second-order derivative at any two points of a disk 5.5 millimeters in diameter contained in the face of the optical base component have an absolute difference of less than $10^{-3}$ mm$^{-1}$/e, irrespective of the position of the disk in the face of the optical base component.

According to a first type of embodiment of the invention, the layer is structured so that two second-order derivatives of the variable refractive index with respect to first and second respective linear spatial coordinates along the face of the optical base component have respective values which are substantially constant and distinct. The layer therefore modifies the optical power and/or the astigmatism and/or the astigmatism axis of the lens under the conditions of use by a wearer, relative to a lens consisting only of the optical base component. This modification in the optical power and the astigmatism conferred by the variable index layer may for example allow the lens to be very precisely adapted to the degree of ametropia of the wearer.

In embodiments of the invention of a second type, the ophthalmic lens is of the progressive lens type. The optical power, the astigmatism and possibly the astigmatism axis of the lens, under normal conditions of use by a wearer, therefore vary when he looks through different portions of the lens. These variations may be provided either by the optical base component or by the variable refractive index layer, or they may result from respective contributions of the optical base component and of the layer. In the former and latter case, the base component is then itself a progressive correcting lens. To this purpose, at least one of its faces may possess mean sphere and cylinder values that vary between different points of this face.

When the optical base component is itself a progressive correcting lens, the layer may produce a change in the addition of the lens, without the near vision point or the distance vision point of the lens moving relative to the positions of these same points in the case of the optical base component by itself. To this purpose, the layer is structured, on the one hand, so that absolute values of second-order derivatives of the variable refractive index with respect to a horizontal spatial coordinate and a vertical spatial coordinate, respectively, along the face of the optical base component under the conditions of use of the lens by a wearer, and expressed in millimeters, are less than $10^{-3}$ mm$^{-1}$/e in an upper portion of the lens lying around a distance vision point and, on the other hand, in such a way that these absolute values of second-order derivatives with respect to the horizontal spatial coordinate and the vertical spatial coordinate, respectively, increase upon moving in the face of the optical base component toward the near vision point lying in a lower portion of the lens, at least one of said absolute values of second-order derivatives being substantially equal to k×A/e at the near vision point, k being a coefficient greater than $0.8 \times 10^{-3}$ mm$^{-1}$.D$^{-1}$ and A being the absolute value of a difference in optical power of the variable refractive index layer between the near vision point and the distance vision point, expressed in diopters (D).

In particular, the absolute value of the difference in optical power of the variable refractive index layer between the near vision point and the distance vision point, denoted by A, may be greater than 0.125 D.

In practice, the coefficient k is less than $1.1 \times 10^{-3}$ mm$^{-1}$.D$^{-1}$ and A is less than 3 diopters for the lenses that have been produced by the inventors.

Furthermore, for the progressive ophthalmic lens thus obtained to be comfortable for the wearer to use, the layer may also be structured so that the mixed second-order derivative of the variable refractive index with respect to both horizontal and vertical spatial coordinates has a maximum value and a minimum value reached at respective points on the face of the optical component lying in a lower half of the lens on either side of a meridian line connecting the distance vision point to the near vision point. Preferably, respective absolute values of these maximum and minimum values are substantially equal to k×A/(2×e).

When the ophthalmic lens possesses a substantially zero prismatic deviation, measured in a known manner at a prismatic reference point of the lens, and when the layer produces a change in addition, the variable refractive index then has a substantially constant value in the upper portion of the lens, and it substantially increases radially in the lower portion of the lens up to a value greater than 0.04 mm$^{-1}$.D$^{-1}$×A/e, within a circle 4 centimeters in diameter centered with respect to the lens. For the lenses produced by the inventors, the refractive index difference between any two points located in the lower portion of the lens is less than 0.15 mm. D$^{-1}$×A/e inside the 4 centimeter diameter circle.

When the optical base component is itself a progressive correcting lens, the layer may also produce a change in the length of progression. Preferably, the layer produces a displacement of the near vision point of the lens relative to the position of the near vision point in the face of the optical base component when the latter itself consists of an ophthalmic lens. It is possible for the distance vision point not to be shifted by the layer in the face of the optical component relative to the position of the distance vision point of the ophthalmic lens formed by the base optical component alone. To this purpose, the layer is structured so that absolute values of second-order derivatives of the variable refractive index with respect to a horizontal spatial coordinate and a vertical spatial coordinate, respectively, along the face of the optical base component under the conditions of use of the lens by a wearer, and expressed in millimeters, are greater than $10^{-4}$ mm$^{-1}$/e at least one point on a meridian line joining the distance vision point to the near vision point of the lens in the face of the optical base component, close to the near vision point, and less than $10^{-4}$ mm$^{-1}$/e at the distance vision point. In practice, the inventors have observed that the absolute values of said second-order derivatives are, at each point on the meridian line, less than 150 times greater than their values at the distance vision point.

Preferably, in order to provide the wearer with visual comfort, the absolute value of the second-order derivative of the variable refractive index with respect to the horizontal spatial coordinate has three maximum values reached in a lower portion of the lens at points respectively lying substantially on the meridian line and on two bisecting lines passing through a center of the face and passing though the right lower and left lower portions of the face respectively, and in such a way that the absolute value of the second-order derivative of the variable refractive index with respect to the vertical spatial coordinate passes through a maximum value reached at a point on the meridian line.

The variable refractive index layer may also produce a change in the design of the progressive lens relative to the optical base component design, while maintaining substantially identical optical power and astigmatism values along the meridian line between the distance vision point and the near vision point relative to the corresponding values of a lens consisting of the base optical component alone. To do this, the layer is structured in such a way that absolute values of second-order derivatives of the variable refractive index with respect to a horizontal spatial coordinate and a vertical spatial coordinate, respectively, along the face of the optical component under the conditions of use of the lens by the wearer, and expressed in millimeters, and also the absolute value of the mixed second-order derivative of the variable refractive index with respect to both, horizontal and vertical spatial coordinates are less than $10^{-4}$ mm$^{-1}$/e at any point on the meridian line joining the distance vision point to the near vision point of the lens in the face of the optical base component. The absolute values of these second-order derivatives may furthermore be less than $10^{-3}$ mm$^{-1}$/e at any point on the face of the optical base component when the variable refractive index layer has no other function than that of modifying the distribution of the astigmatism and/or the optical power in the lateral regions of the lens.

The invention also proposes a pair of prescription spectacles comprising a frame and at least one ophthalmic lens as described above.

Other features and advantages of the present invention will become apparent in the following description of four nonlimiting exemplary embodiments, with reference to the appended drawings in which.

Figure 5:
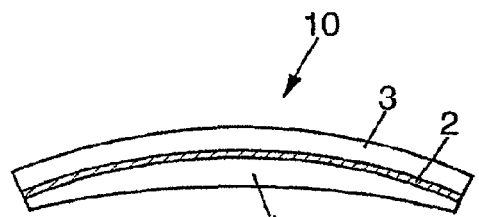

FIGS. 3a-3e correspond to FIGS. 2a-2e for a third embodiment of the invention;

FIGS. 4a-4e correspond to FIGS. 2a-2e for a fourth embodiment of the invention; and FIG. 5 is a sectional view of an ophthalmic lens according to a fifth embodiment of the invention.

Figure 1A:
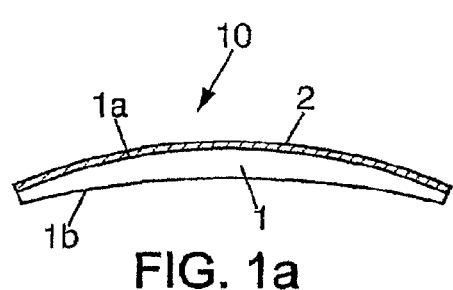
FIGS. 1a and 1b are a sectional view and a plan view, respectively, of an ophthalmic lens according to a first embodiment of the invention.

As shown in FIG. 1a, an ophthalmic lens 10 consists of an optical base component 1 bounded by a front face 1a and by a rear face 1b. The component 1 is transparent and may be made of a mineral or organic material, characterized by a refractive index value.

The optical base component 1 is coated on its face 1a with a layer 2 of active material. In all the examples described, the layer 2 has a constant thickness, denoted by e and equal to 0.5 mm. In other words, the thickness e of the layer 2 is identical at all points on the face 1a of the component 1.

The use of the lens 10 by a wearer corresponds to variable directions of observation through the lens. A light ray coming from a given direction of observation cuts each face of the lens 1a, 1b at respective points of intersection and passes through the center of rotation of the eye, which is assumed to be stationary. The points of intersection of the light ray with each face 1a, 1b are determined according to the principles of optical refraction. The optical power and astigmatism values of the progressive lens, for a given direction of observation, therefore result from the curvatures of each face 1a and 1b at the points of intersection of the optical ray, from the refractive index value of the optical base component 1 and from the variations in the refractive index of the layer 2 along the path of the ray between the points of intersection with each face.

To give an example, the layer 2 may consist of a photoactive material, so that the refractive index of the layer 2 may be locally modified at each point on the surface 1a by appropriately irradiating the layer at this point. Documents EP 1 225 458 and U.S. Pat. No. 6,309,803 describe an active material sensitive to ultraviolet light of 365 nm (nanometer) wavelength, which may be used to produce the layer 2 according to the invention. Such an active material may polymerize in two different phases, which are selected by the polymerization conditions applied to the layer 2. The first phase corresponds to an organic polymer network. It is formed when the active material is irradiated. The second phase corresponds to an inorganic polymer network and is formed when the active material is heated. The refractive index of the first phase is lower than that of the second phase.

Such an active material may be deposited on the component 1 by dipping the component 1 into a solution of precursors. Such a deposition method is called dip coating. The solution comprises two precursors capable together of forming an organic polymer network or an inorganic polymer network. The two precursors are 3-(trimethoxysilyl)propyl methacrylate and the product resulting from the reaction between zirconium n-propoxide and methacrylic acid. Irgacure 1800, commercially available from the supplier CIBA for example, is also added to the precursor solution. After dipping the component 1 into the precursor solution, the component 1 is heated for about 30 minutes at a temperature of 60° C. or higher. The dried layer 2 of active material is thus obtained on the face 1a of the component 1.

When a portion of the active material of the layer 2 is irradiated with ultraviolet light of 365 nm wavelength, the organic polymer network forms with a density that depends on the duration and the intensity of the irradiation. The component 1 is then heated for 20 to 45 minutes at a temperature of 100° C. or higher. The inorganic polymer network then forms. In the portions of the layer 2 that have not been irradiated beforehand, a pure phase of high refractive index forms. In the portions of the layer 2 that have been irradiated beforehand, the inorganic polymer network is formed from the amounts of precursors that have not been consumed by the organic polymerization. Intermediate refractive index values between the extreme values corresponding to the pure inorganic network and to the pure organic network are thus obtained in the irradiated portions.

After the heating to form the inorganic polymer network, the two precursors are completely consumed. The material of the layer 2 is then insensitive to further irradiation by ultraviolet light at 365 nm wavelength. The variations in the refractive index of the layer 2 which have been created in this way are therefore definitive.

Figure 1B:
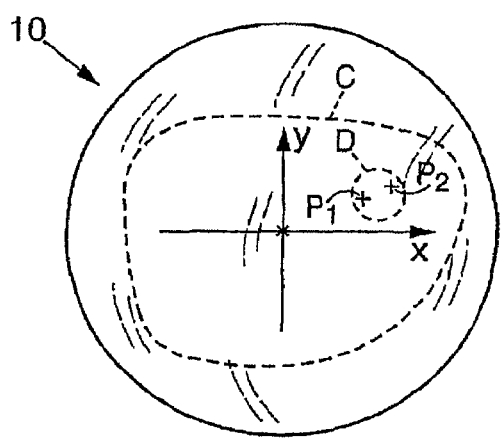

A lens ready to be fitted into a spectacle frame is obtained in a known manner by routing the lens 10 along a path C that corresponds to the shape of the frame (FIG. 1b). The optical component 1 may in particular be a solar lens, intended to provide protection against being dazzled by absorbing some of the light, a contrast-enhancing lens by coloration or by polarization filtering, an ametropia-correcting lens, etc. It may especially be an afocal, unifocal, bifocal, multifocal or progressive lens, or a lens having a diffractive surface, the variable index layer being placed, in the latter case, on a refractive surface of the component.

In the examples that follow, it is assumed that the layer 2 is irradiated so that its refractive index, denoted by n, is constant over the thickness of the layer 2 at each point on the surface 1a.

According to a first embodiment of the invention, the refractive index variations created in the layer 2 correspond to constant values of second-order derivatives of this index with respect to two linear spatial coordinates, x and y respectively, which are defined on the face 1a of the component 1 (figure b). Likewise, the mixed second-order derivative with respect to x and y is constant. In other words:

$$\frac{\delta^2 n}{\delta x^2} = C_1, \frac{\delta^2 n}{\delta y^2} = C_2, \frac{\delta^2 n}{\delta x \delta y} = C_3,$$

where $C_1$, $C_2$ and $C_3$ are constants. In the particular case where $C_1=C_2$ and $C_3=0$, the astigmatism of the layer is zero and its optical power is defined by $C_1$.

In the more general case where $C_3$ is not zero and where $C_1$ may be different from $C_2$, the layer 2 is then equivalent to a unifocal correcting lens having a specific optical power and a specific astigmatism. These optical characteristics of the layer 2 then combine with those of the optical base component 1 when the lens 10 is used by a wearer. To give an example, $C_1$, $C_2$ and $C_3$ values of $-3 \times 10^{-4}$ mm$^{-2}$, $-5 \times 10^{-4}$ mm$^{-2}$ and $2 \times 10^{-4}$ mm$^{-2}$ respectively correspond to a contribution by the layer of about 0.25 diopter to the optical power of the lens 10, to a contribution of about 0.25 diopter to the astigmatism of the lens 10, for a layer thickness of 0.5 mm, and a refractive index at the origin of the lens (x=0 and y=0) of 1.502.

Thus, starting from several identical optical base components 1, it is possible to obtain lenses 10 corresponding to different prescriptions by irradiating the layer 2 of each lens differently in order to obtain variable second-order derivatives of the refractive index of the layer 2. For example, available models of the optical component 1 may correspond to optical power and astigmatism values varying in steps of 0.25 D (diopters). The layer 2 therefore makes it possible to obtain optical power and astigmatism values of the lens 10 that are intermediate between those of two models of the component 1. To this purpose, the layer 2 provides a contribution to the optical power and to the astigmatism of the lens which combines with that of the component 1. A customized ametropia correction may thus be obtained, which makes it possible for each lens to be adapted more precisely to the degree of ametropia of the wearer.

The orientation of the variations in the index n parallel to the face 1a, in other words the orientation by rotation of the x and y axes in the face 1a, may be varied. In particular, the orientation may be adapted so that the optical characteristics of both the layer 2 and the component 1 combine to obtain a resulting lens 10 which corresponds to the wearer's astigmatism prescription, both in value and in direction.

In the other embodiments that will be described below, the lens 10 again has a structure as illustrated by FIGS. 1a and 1b, but the x and y axes are respectively oriented horizontally and vertically when the lens is used by the wearer with his head in a straight position. The positive values of x determine a lateral half of the lens 10 located close to the wearer's nose. This half is called the "nasal" portion of the lens. Conversely, the other lateral half of the lens, for negative values of x, is located near the wearer's temples and is denoted by the term "temporal" portion of the lens. The positive values of y determine the upper half of the lens. When this half is used by the wearer, he is looking in distance vision mode. The negative values of y correspond to the intermediate vision portion and the near vision portion of the lens. The lens is fitted in such a way that, when the wearer looks straight in front of him, the direction of his gaze passes through a point called the "fitting cross" located 4 mm above the origin (x=0, y=0) of the face of the lens. The distance vision point is generally located 4 mm above the fitting cross.

The optical base component 1 is itself a progressive correcting lens. The lens 10 is then also a progressive correcting lens.

Figure 2A:
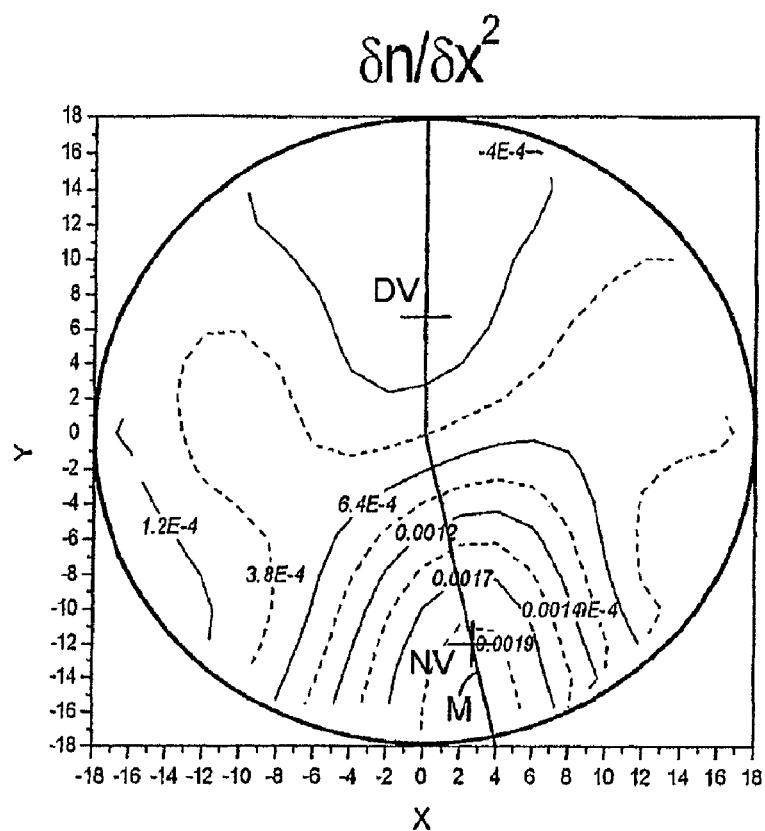
FIGS. 2a-2c are maps showing the variations in the refractive index for a second embodiment of the invention.
Figure 2B:
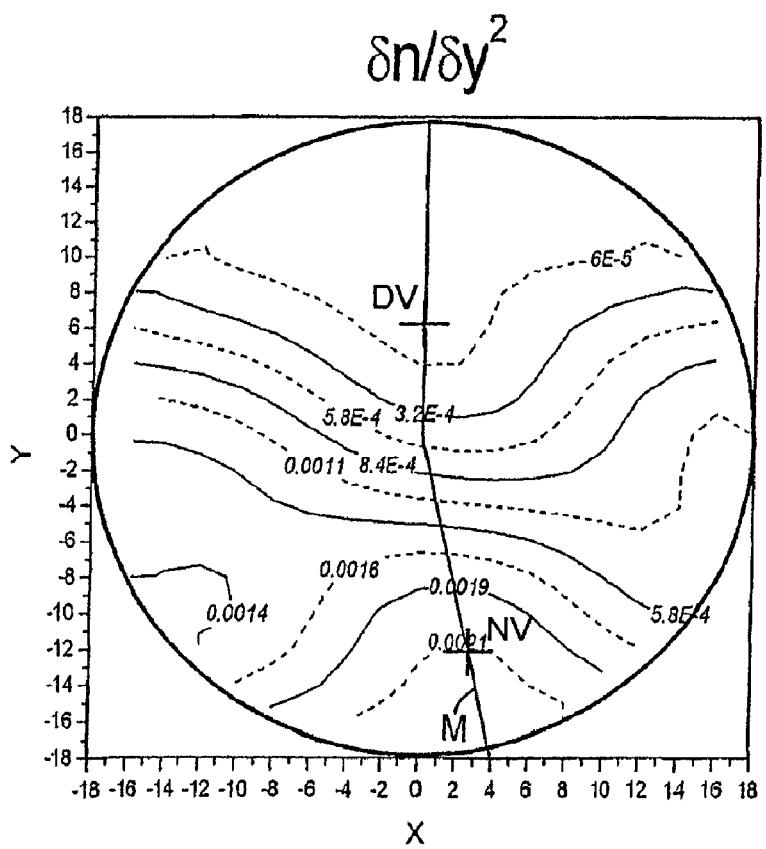
Figure 2C:
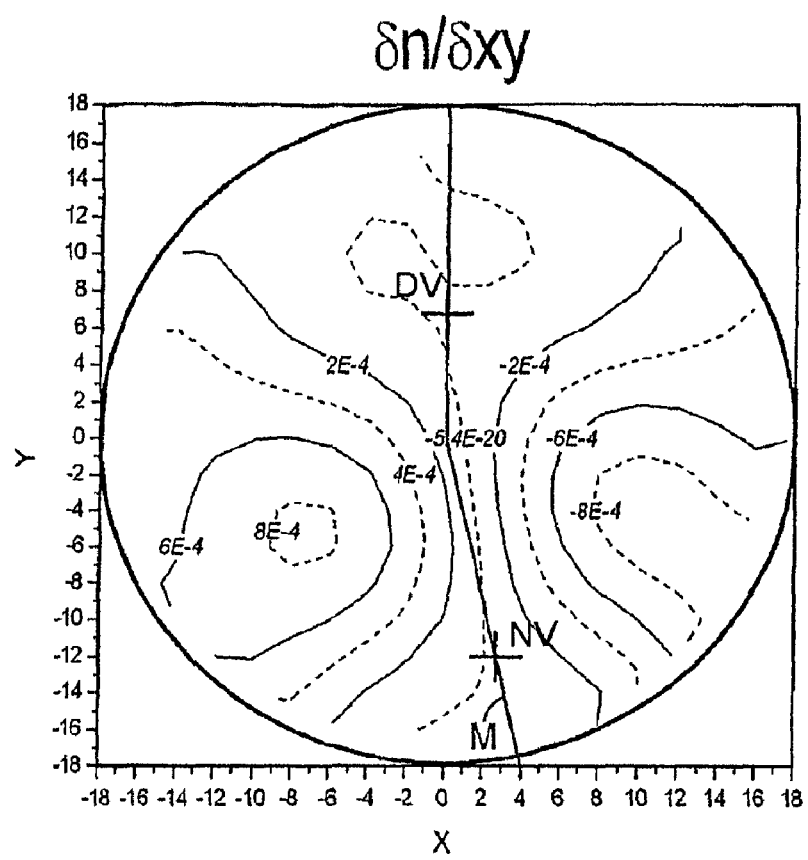

FIGS. 2a-2c are maps of the second-order derivatives of the refractive index n of the layer 2 with respect to x, with respect to y and with respect to x and y respectively:

$$\frac{\delta^2 n}{\delta x^2}$$

in the case of FIG. 2a, $$\frac{\delta^2 n}{\delta y^2}$$

in the case of FIG. 2b, and $$\frac{\delta^2 n}{\delta x \delta y}$$

in the case of FIG. 2c.

The coordinates x and y are expressed in millimeters. Each of these maps is bounded by the circular peripheral edge of the lens 10. The lenses produced by the inventors all have a diameter of 36 mm (millimeters). Each curve plotted on one of the maps joins points on the face 1a that are associated with the same value of the second-order derivative. This value is indicated on the corresponding curve.

As shown in FIGS. 2a and 2b relating to the second exemplary embodiment of the invention, the two second-order derivatives of n with respect to x and y have low absolute values in the upper portion of the lens (for positive values of y), namely less than $10^{-3}$ mm$^{-2}$. Furthermore, these two second-order derivatives increase in value in the lower portion of the lens (for negative values of y) upon moving along a meridian line M, which is substantially coincident with the y axis (x=0) in the upper portion of the lens and slightly shifted to the side with positive values of x in the lower portion of the lens.

As shown in FIG. 2c, the mixed second-order derivative of n with respect to x and y has a maximum value reached at a point lying in the lower temporal quarter of the lens 10 (for negative values of x and y) and a minimum value reached at a point lying in the lower nasal quarter of the lens (for positive values of x and negative values of y). These values are +8×10⁻⁴ mm⁻² and −8×10⁻⁴ mm⁻² respectively. More generally, the map of the mixed second-order derivative of n with respect to x and y has an approximately antisymmetric structure with respect to the meridian line M. In other words, two points on the lens that are associated with respective values of the mixed derivative which are on opposite sides are located approximately symmetrically with respect to each other, relative to the line M.

Figure 2D:
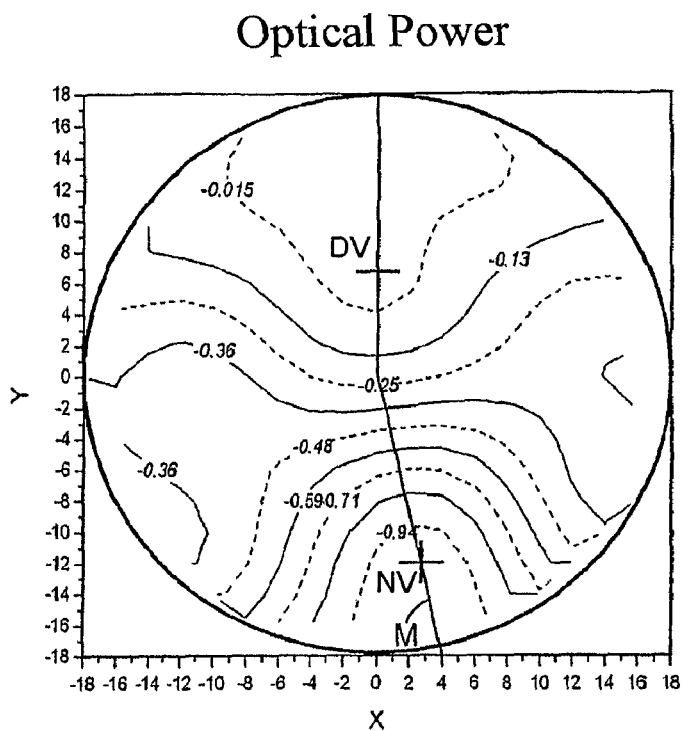
FIGS. 2d and 2e are maps showing the contributions to the optical power and to the astigmatism for an ophthalmic lens corresponding to FIGS. 2a-2c.
Figure 2E:
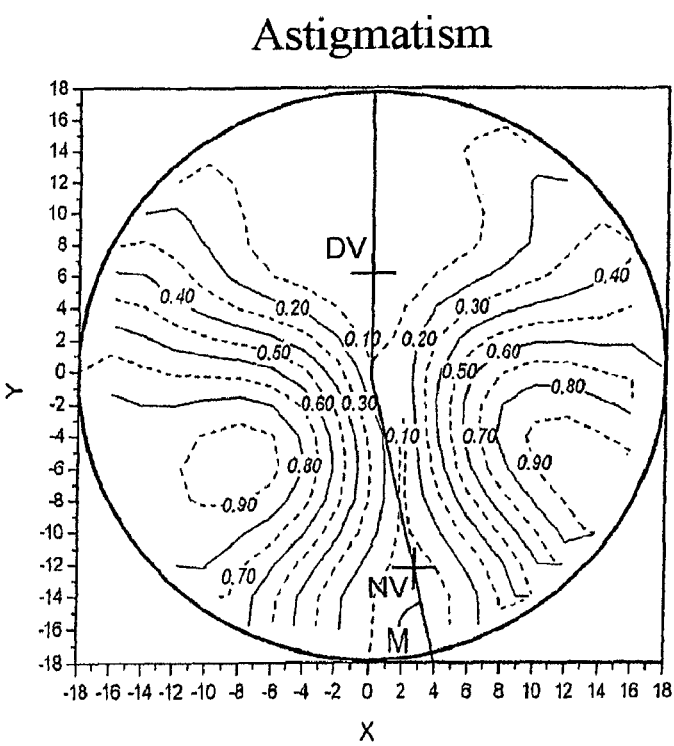

FIGS. 2d and 2e illustrate the contributions by the layer 2 to the optical power and astigmatism variations of the lens 10 respectively. Indicated for each point of coordinates x and y on the face of the lens are the optical characteristics obtained in the direction of observation passing through the center of rotation of the eye and this point. The lines indicated on FIG. 2d are isopower lines of the layer 2 that join points on the face 1a that correspond to the same contribution by the layer 2 to the optical power of the lens 10, for directions of observation through the lens 10 passing through these points. This optical power value is indicated in diopters for each isopower line.

Indicated on the maps of the lens 10 shown in FIGS. 2d and 2e are two points DV and NV. These points correspond to the intersection of the direction of observation by a person wearing the lens 10 with the face 1a of the component 1 for a distance vision (DV) situation and for a near vision (NV) situation respectively. Around the distance vision point DV, the contribution by the layer 2 to the optical power is about −0.01 D, whereas this contribution is about −1.0 D at the near vision point NV. Furthermore, the contribution by the layer 2 to the optical power decreases, in absolute value, on either side of the point NV on moving parallel to the x axis. The layer 2 therefore creates a reduction in a long-sight correction of the lens 10 about the near vision point NV relative to the correction provided only by the base component 1 at the point NV. At the same time, the layer 2 does not substantially modify the optical power around the distance vision point DV relative to the corresponding value for the component 1 alone. In other words, the layer 2 reduces the addition of the lens 10 relative to that of a lens consisting only of the optical base component 1. The absolute difference, denoted by A, in the contribution by the layer 2 to the optical power between the points NV and DV is, for the example corresponding to FIGS. 2a-2e, about 0.8 D. It may be verified that the second derivatives of n with respect to x on the one hand (FIG. 2a) and with respect to y on the other (FIG. 2b) each have an absolute value greater than $0.8 \times 10^{-3}$ mm⁻¹.D⁻¹×A/e=0.8×10⁻³×0.8/0.5=1.3×10⁻³ mm⁻² at the near vision point NV.

Likewise, it may be verified that the maximum and minimum values of the mixed derivative of n with respect to x and y (FIG. 2c) are substantially equal, in absolute value, to 0.8×10⁻³ mm⁻¹.D⁻¹×A/(2×e)=0.8×10⁻³×0.8/(2×0.5)=6.4×10⁻⁴ mm⁻².

The surface showing a distribution of the index n as a function of the two coordinates x and y therefore possesses an amphitheater shape: n has an almost constant value in the upper portion of the lens, for positive values of y, and a value that increases radially in the lower portion of the lens, for negative values of y. The refractive index n is therefore a maximum in the lower portion of the circumference of the lens, and the difference between the maximum value of the index n and the value of n in the upper portion of the lens is greater than 0.04×0.8/0.5=0.064. The prismatic deviation of the lens measured at the origin (x=0, y=0), generally called the prismatic reference point, is zero.

The lines indicated in FIG. 2e are isoastigmatism lines, which join points on the face 1a that correspond to the same contribution by the layer 2 to the astigmatism of the lens 10. It may be seen that the layer 2 introduces no significant astigmatism contribution along the meridian line M of the lens 10 that joins the distance vision point DV to the near vision point NV. In contrast, the contribution by the layer 2 to the astigmatism of the lens 10 increases upon moving laterally away from the meridian line M from the nasal side and the temporal side.

It should be noted that in this second embodiment of the invention corresponding to a change of addition, the layer 2 does not shift the points NV and DV relative to the positions of these points defined by the optical base component 1 when the latter is used alone to constitute a progressive corrective lens.

The third exemplary embodiment of the invention, described now with reference to FIGS. 3a-3e, is an ophthalmic lens in which the layer 2 has the effect of shifting the near vision point NV relative to the position of NV for the optical base component 1, when the latter is used without a layer to form an ophthalmic lens. In other words, the layer 2 produces a change in the progression length of the lens. The base component 1 is identical to that of the previous example, namely a progressive lens whose near vision point and distance vision point are denoted by NV1 and DV1, respectively, in FIGS. 3a-3e. The approximate coordinates of NV1 are $x_1$=2.7 mm and $y_1$=−13.0 mm. The meridian line of a lens consisting only of the component 1 is denoted by M1.

As is known, the near vision point of a progressive lens is located at the center of a region of the lens in which the optical power is substantially constant and a maximum. At the same time, the resulting astigmatism, which is the residual astigmatism of the wearer provided with the lens (defined in the article "*PAL performance analysis for torical prescription*" by Thierry Baudart, Essilor International, "Technical Digest" 1996, pp. 190/SuA3, presented at the conference "Vision Science and its Applications", 1-5 February 1996, Santa Fe, N. Mex.), has a low value at the near vision point, or close to it. From the optical power and astigmatism maps of FIGS. 3d and 3e, the layer 2 is itself equivalent to a virtual progressive lens having its own near vision point, denoted by NV2 with approximate coordinates $x_2$=2.7 mm and $y_2$=−7.0 mm. The near vision point of the lens 10 therefore lies at an intermediate position between NV1 and NV2. In this third exemplary embodiment of the invention, the layer 2 therefore generates a shift in the near vision point, from the position NV1 to an intermediate position between those of NV1 and NV2.

The lines referenced M1 and M2 in FIGS. 3a-3e are the meridian line of the component 1 alone and the meridian line of the lens 10 comprising the component 1 and the layer 2, respectively. From FIGS. 3a and 3b, the second-order derivatives of the index n of the layer 2 with respect to x and with respect to y respectively each have a minimum lying close to NV2, at a point located approximately on the meridian line M2. Each of these minima corresponds to a maximum of the corresponding absolute value. This maximum absolute value of the second-order derivative with respect to x is about 1.1×10⁻³ mm⁻². For the y coordinate, the maximum absolute value reached at a point on the meridian line M2 is about 1.5×10⁻³ mm⁻². These two values are greater than 10⁻⁴ mm⁻¹/e=2×10⁻⁴ mm⁻².

Figure 3A:
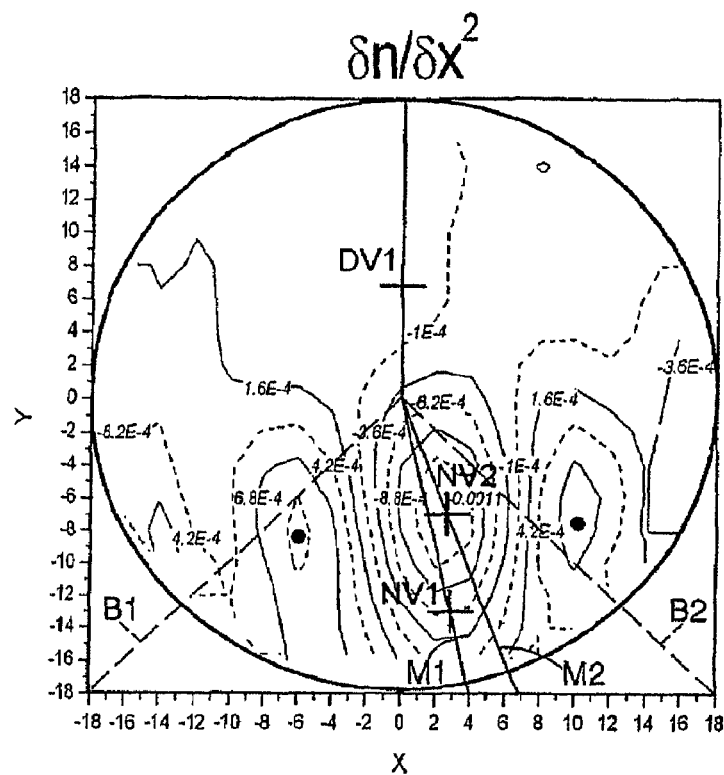

In FIG. 3a, the second-order derivative of the index n with respect to x also has two maxima. Each of these maxima is reached at a point located close to one of the two bisectors B1 and B2 of the lower nasal quarter and lower temporal quarter, respectively, of the lens. The bisectors B1 and B2 are shown as broken lines.

Figure 3B:
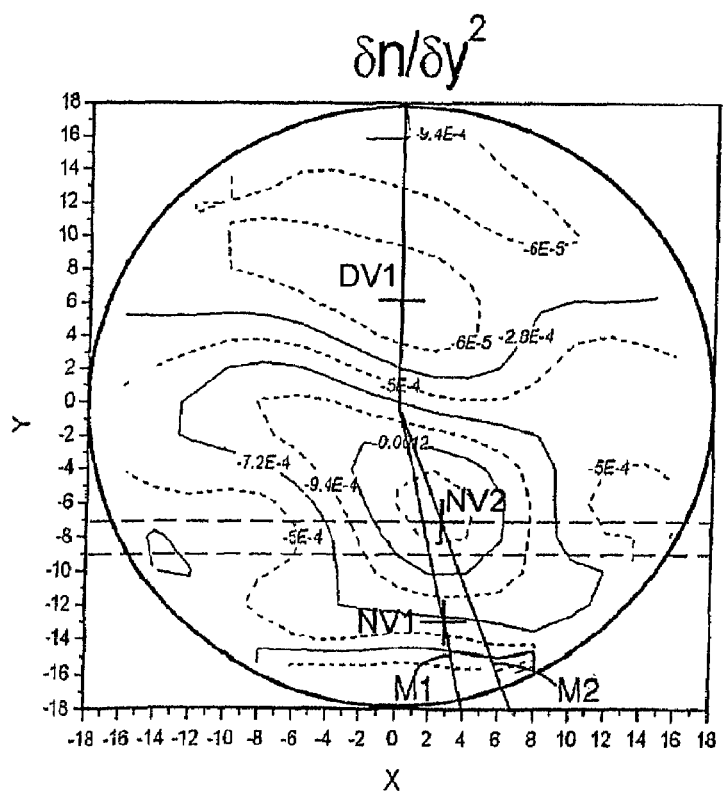
Figure 3C:
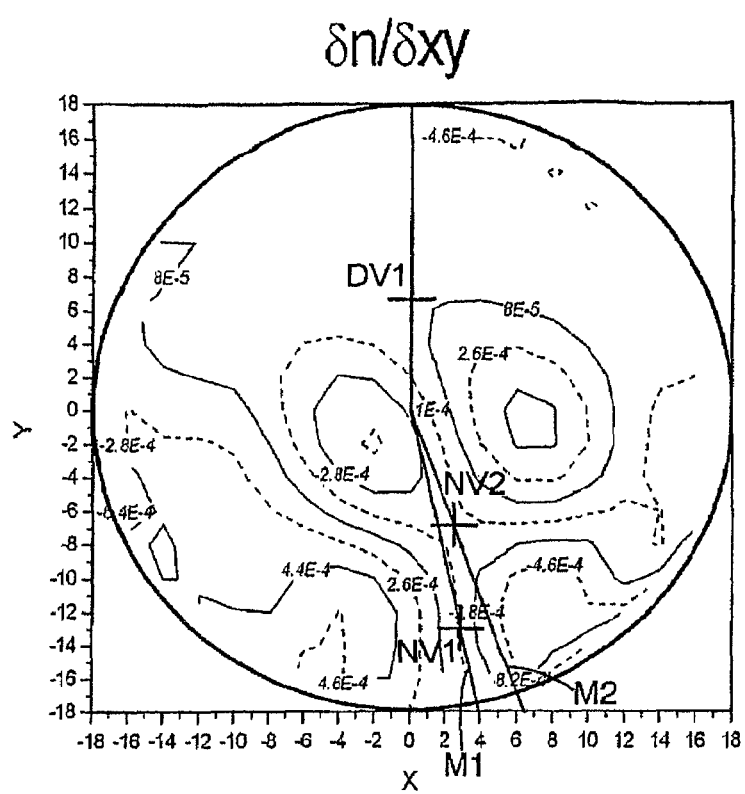
Figure 3D:
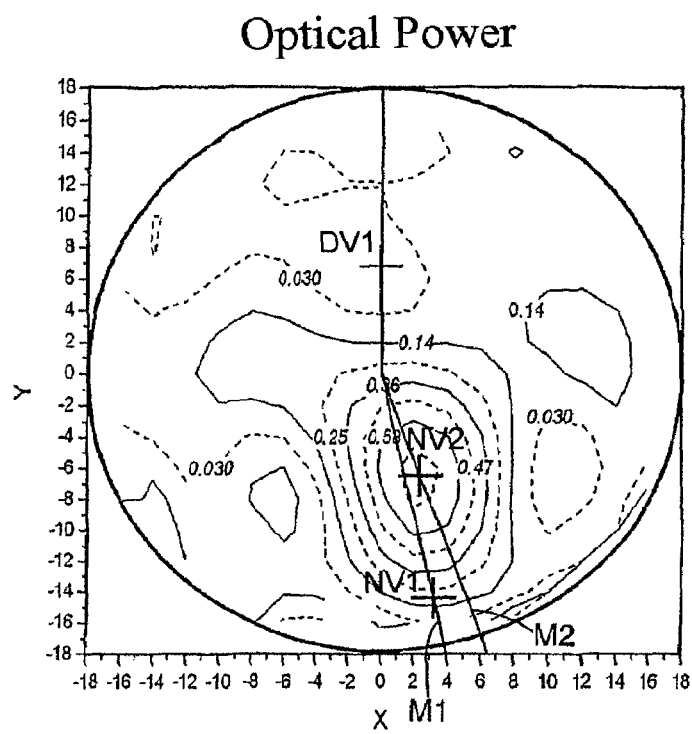
Figure 3E:
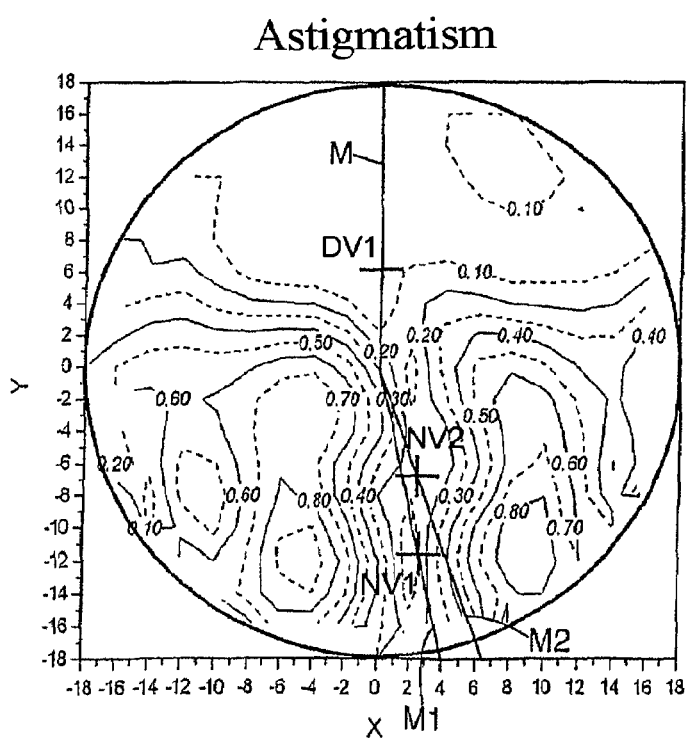
Figure 4A:
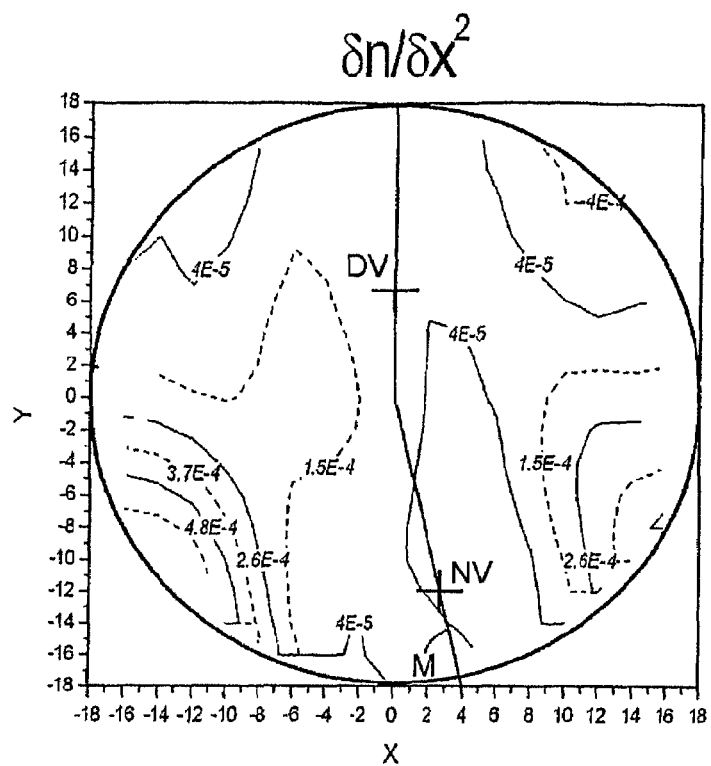
Figure 4B:
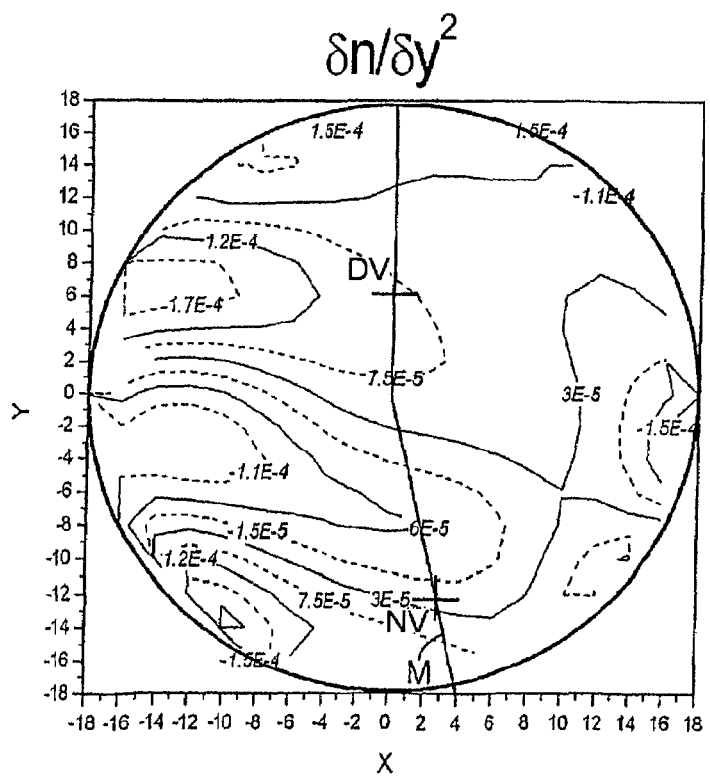
Figure 4C:
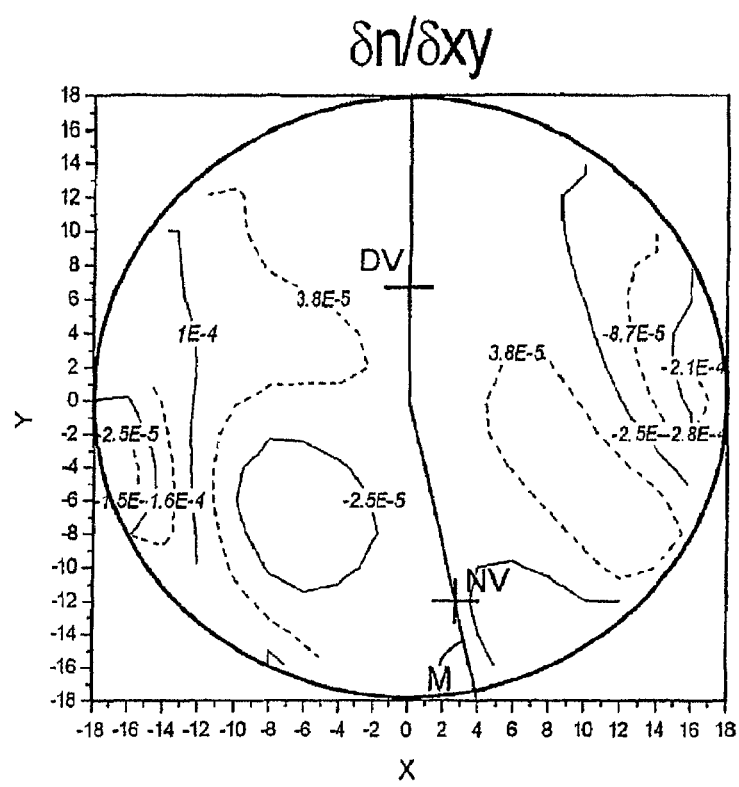
Figure 4D:
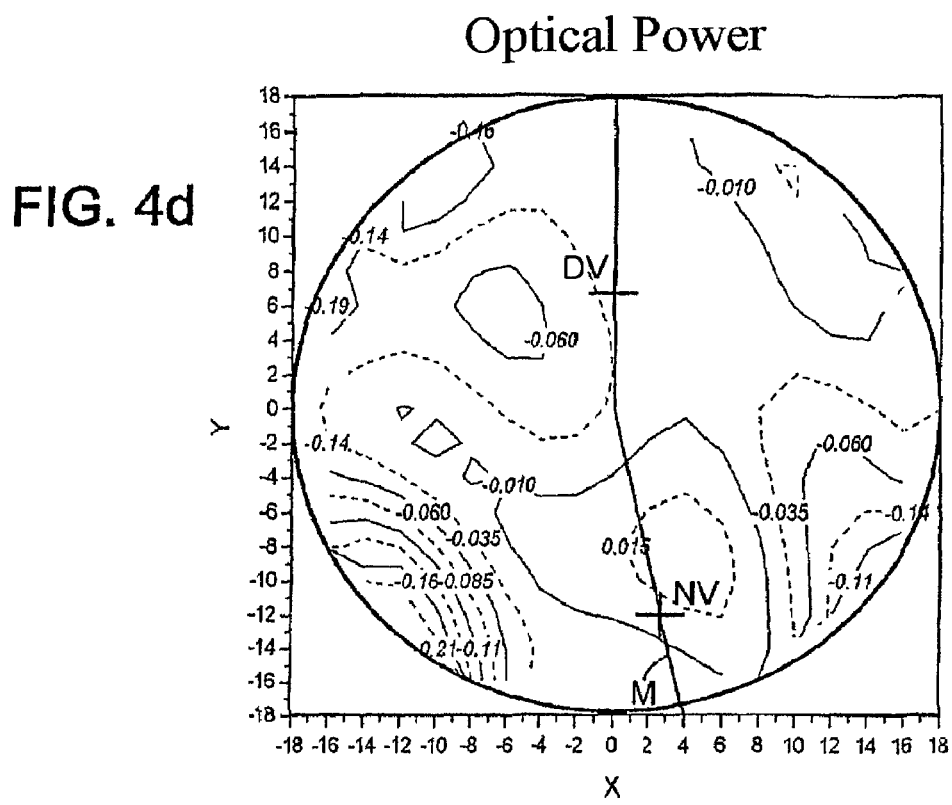
Figure 4E:
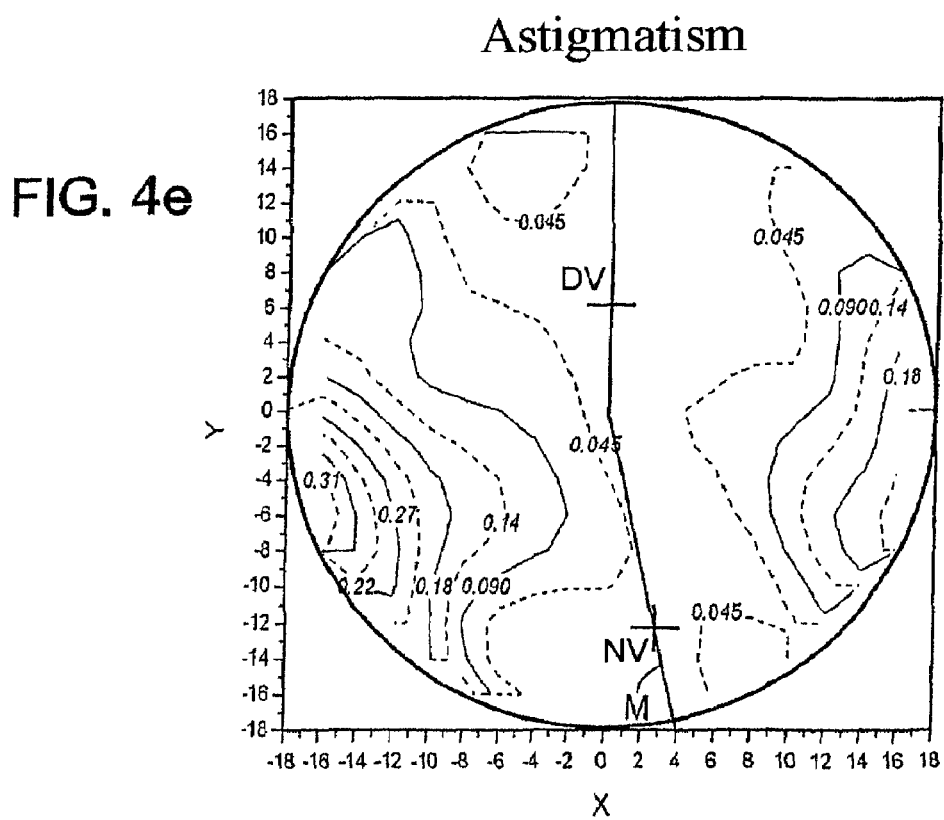

Furthermore, in FIG. 3b the second-order derivative of the index n with respect to y passes through a maximum absolute value upon moving along lines parallel to the x axis in the lower portion of the lens 10 (broken lines in FIG. 3b).

In the upper portion of the lens, the second-order derivatives of the index n with respect to x (FIG. 3a) and with respect to y (FIG. 3b), respectively, are less than $10^{-4}$ mm$^{-1}$/e=$10^{-4}$/0.5=$2\times10^{-4}$ mm$^{-2}$.

Finally, as in the second exemplary embodiment of the invention, the map of the mixed second-order derivative of n with respect to x and y has an approximately antisymmetric structure with respect to the meridian line M2.

In the two previous exemplary embodiments of the invention, the layer 2 is designed to provide a contribution to the optical power of the lens 10, the absolute value of which is maximal at a point on the meridian, close to the near vision point of the lens. In contrast, the fourth exemplary embodiment of the invention that will now be described with reference to FIGS. 4a-4e illustrates a contribution by the layer 2 to the optical characteristics of the lens which is mainly distributed away from the meridian line. This may be seen in the maps of FIGS. 4d and 4e, which show that the contributions by the layer 2 to the optical power and to the astigmatism, respectively, of the lens 10 are maximal, in absolute value, close to the periphery of the lens in the left and right lower quarters of the lens. Such a layer 2 modifies the design of the progressive lens relative to the design of the optical base component 1. In particular, the layer 2 may be structured so that the lens 10 provides the wearer with a distance vision field substantially free of astigmatism that is wider or narrower, along the horizontal direction x, than a virtual distance vision field substantially free of astigmatism associated with the optical base component 1 used alone to constitute an ophthalmic lens.

To this purpose, the second-order derivatives of the index n of the layer 2 with respect to x (FIG. 4a) and with respect to y (FIG. 4b) and also the mixed derivative with respect to both x and y (FIG. 4c) are less than $10^{-4}$ mm$^{-1}$/e=$10^{-4}$/0.5=$2\times10^{-4}$ mm$^{-2}$ at each point on the meridian line M. The maximum absolute values of these derivatives are reached at points located in the lateral portions of the lens 10.

The four exemplary embodiments of the invention described in detail above exhibit progressive variations in the refractive index n of the layer 2. It may be verified that, for each of these embodiments, each second-order derivative of n differs in value by less than $10^{-3}$ mm$^{-1}$/e=$10^{-3}$/0.5=$2\times10^{-3}$ mm$^{-2}$ between any two points P1 and P2 lying inside a 5.5 millimeter disk D (FIG. 1b), whatever the position of the disk D may be in the face 1a of the optical base component 1. It should be understood that, when the index n is numerically adjusted, the minimum difference between two values of n produced in adjacent pixels of the face 1a cannot be considered as creating a difference in value of the second-order derivative of more than $10^{-3}$ mm$^{-1}$/e. The values of the derivatives must therefore be evaluated on an appropriate number of pixels.

Furthermore, in all these exemplary embodiments, whether they relate to a modification in the astigmatism of the lens, a change of addition, a change of progression length or a change of design introduced by the layer, the variations in the refractive index of the layer have no symmetry of revolution. Such absence of symmetry, which allows the layer to produce a complex optical function, is visible in the index variation maps corresponding to each embodiment.

Many modifications may be made to the invention relative to the exemplary embodiments that have been described in detail. In particular, the layer 2 may be formed on the rear face 1b of the optical base component 1. As illustrated by FIG. 5, the layer 2 may also be covered with another transparent optical component, referenced 3, so that the layer 2 is sandwiched between the two components 1 and 3. The layer 2 is thus protected from any scratches or chemical attack. In this case, the variations in the refractive index n may be produced before or after the layer 2 is inserted between the two components 1 and 3, depending on the process used to vary the refractive index n.

Finally, the ophthalmic lens may correspond to various production states when the refractive index of the layer is modulated in order to generate contributions to the optical power and/or to the astigmatism of the lens. In particular, the faces of the lens may have definitive mean sphere and cylinder distributions. The variable refractive index of the layer may therefore be modulated in order to customize the lens according to the wearer. Alternatively, the lens obtained after the refractive index of the layer has been modulated may be a semifinished lens. In this case, one of its faces is intended to be subsequently machined so as to give this face mean sphere and cylinder values adapted according to measurements made on the wearer of the lens.

The invention claimed is:

1. An ophthalmic lens comprising:
an optical base component substantially transparent for at least one wavelength of visible light; and
at least one layer placed on a face of the optical base component, said layer being substantially transparent and having a variable refractive index at said wavelength, in which the layer is structured so that at least one second-order derivative of the variable refractive index with respect to a linear spatial coordinate (x,y) along the face of the optical base component, expressed in millimeters, is greater than $10^{-4}$ mm$^{-1}$/e, in absolute value and at least one point on said face, e being the thickness of the variable refractive index layer expressed in millimeters, and in which the variation in the refractive index of the layer has no symmetry of revolution.

2. The ophthalmic lens as claimed in claim 1, in which at least one second-order derivative of the variable refractive index with respect to a linear spatial coordinate (x,y) along the face of the optical component, expressed in millimeters, is greater than $2\times10^{-4}$ mm$^{-1}$/e, e being the thickness of the variable refractive index layer expressed in millimeters.

3. The ophthalmic lens as claimed in claim 1, in which the thickness e of the variable refractive index layer is substantially constant between different points on the face of the optical base component.

4. The ophthalmic lens as claimed in claim 1, in which the thickness e of the variable refractive index layer is between 0.1 and 1.0 mm.

5. The ophthalmic lens as claimed in claim 4, which furthermore includes another optical component substantially transparent at said wavelength, placed on a side of the variable refractive index layer opposite from the optical base component.

6. The ophthalmic lens as claimed in claim 1, of the progressive lens type.

7. The ophthalmic lens as claimed in claim 6, in which the optical base component is a progressive correcting lens.

8. The ophthalmic lens as claimed in claim 1, in which the layer is furthermore structured so that two second-order derivatives of the variable refractive index with respect to first (x) and second (y) respective linear spatial coordinates along the face of the optical base component have respective values which are substantially constant and distinct.

9. The ophthalmic lens as claimed in claim 1, in which the layer is furthermore structured so that absolute values of second-order derivatives of the variable refractive index with respect to a horizontal spatial coordinate (x) and a vertical spatial coordinate (y), respectively, along the face of the optical base component under the conditions of use of the lens by a wearer, and expressed in millimeters, are less than $1C^{-3}$ mm$^{-1}$/e in an upper portion of the lens located around a distance vision point of the lens in said face and that said absolute values of second-order derivatives with respect to the horizontal spatial coordinate (x) and the vertical spatial coordinate (y), respectively, increase upon moving in said face toward a near vision point of the lens located in a lower portion of the lens, at least one of said absolute values of second-order derivatives being substantially equal to k×A/e at the near vision point, k being a coefficient greater than 0.8× $10^{-3}$ mm$^{-1}$.D$^{-1}$ and A being the absolute value of a difference in optical power of the variable refractive index layer between the near vision point and the distance vision point, expressed in diopters.

10. The ophthalmic lens as claimed in claim 9, in which the absolute value A of the difference in optical power of the variable refractive index layer between the near vision point and the distance vision point is greater than 0.125 D.

11. The ophthalmic lens as claimed in claim 9, in which the layer is furthermore structured so that a mixed second-order derivative of the variable refractive index with respect to both horizontal (x) and vertical (y) spatial coordinates has a maximum value and a minimum value reached at respective points on the face of the optical component located in a lower half of the lens on either side of a meridian line connecting the distance vision point to the near vision point in said face of the optical base component, respective absolute values of said maximum and minimum values being substantially equal to k×A/(2×e).

12. The ophthalmic lens as claimed in claim 1, which has a substantially zero prismatic deviation at a prismatic reference point, and in which the layer is furthermore structured so that the variable refractive index has a substantially constant value in an upper portion of the lens, and it substantially increases radially in a lower portion of the lens up to a value greater than 0.04 mm$^{-1}$.D$^{-1}$×A/e, within a circle 4 centimeters in diameter centered with respect to the lens, A being the absolute value of a difference in optical power of the variable refractive index layer between a near vision point and the distance vision point of the lens, expressed in diopters, and e being the thickness of the variable refractive index layer expressed in millimeters.

13. The ophthalmic lens as claimed in claim 1, in which the layer is furthermore structured so that absolute values of second-order derivatives of the variable refractive index with respect to a horizontal spatial coordinate (x) and a vertical spatial coordinate (y), respectively, along the face of the optical base component under the conditions of use of the lens by a wearer, and expressed in millimeters, are greater than $10^{-4}$ mm$^{-1}$/e at least one point on a meridian line connecting a distance vision point to a near vision point of the lens in said face of the optical base component, close to the near vision point, and less than $10^{-4}$ mm$^{-1}$/e at the distance vision point, e being the thickness of the variable refractive index layer expressed in millimeters.

14. The ophthalmic lens as claimed in claim 13, in which the layer is furthermore structured so that the absolute value of the second-order derivative of the variable refractive index with respect to the horizontal spatial coordinate (x) has three maximum values reached in a lower portion of the lens at points respectively lying substantially on the meridian line and on two bisecting lines passing through a center of the face and passing though the right lower and left lower portions of said face respectively, and so that the absolute value of the second-order derivative of the variable refractive index with respect to the vertical spatial coordinate (y) passes through a maximum value reached at a point on the meridian line upon moving along horizontal lines in a lower portion of said face.

15. The ophthalmic lens as claimed in claim 1, in which the layer is furthermore structured so that absolute values of second-order derivatives of the variable refractive index with respect to a horizontal spatial coordinate (x) and a vertical spatial coordinate (y), respectively, along the face of the optical component under the conditions of use of the lens by a wearer, and expressed in millimeters, and also the absolute value of a mixed second-order derivative of the variable refractive index with respect to both, horizontal (x) and vertical (y) spatial coordinates are less than $10^{-4}$ mm$^{-1}$/e at any point on a meridian line connecting a distance vision point to a near vision point of the lens in the face of the optical base component.

16. The ophthalmic lens as claimed in claim 15, in which the variable refractive index layer is furthermore structured so that the lens provides the wearer with a distance vision field substantially free of astigmatism that is wider, along the horizontal direction (x), than a virtual distance vision field substantially free of astigmatism associated with the optical base component used alone as an ophthalmic lens.

17. The ophthalmic lens as claimed in claim 15, in which the variable refractive index layer is furthermore structured so that the lens provides the wearer with a distance vision field substantially free of astigmatism that is narrower along the horizontal direction (x), than a virtual distance vision field substantially free of astigmatism associated with the optical base component used alone as an ophthalmic lens.

18. Prescription spectacles comprising a frame and at least one ophthalmic lens as claimed in claim 1.

19. An ophthalmic lens comprising:
an optical base component substantially transparent for at least one wavelength of visible light; and
at least one layer placed on a face of the optical base component, said layer being substantially transparent and having a variable refractive index at said wavelength, in which the layer is structured so that at least one second-order derivative of the variable refractive index with respect to a linear spatial coordinate (x, y) along the face of the optical base component, expressed in millimeters, is greater than $10^{-4}$ mm$^{-1}$ e in absolute value and at least one point on said face, e being the thickness of the variable refractive index layer expressed in millimeters, and in which the variation in the refractive index of the layer has no symmetry of revolution,
wherein the layer is furthermore structured so that, for each second-order derivative of the variable refractive index with respect to one linear spatial coordinate (x,y) along the face of the optical component, expressed in millimeters, and for each mixed second-order derivative of the variable refractive index with respect to both coordinates, respective values of said second-order derivative at any two points of a disk 5.5 millimeters in diameter contained in the face of the optical base component have an absolute difference of less than $10^{-3}$ mm–1/e, whatever the position of the disk may be within the face of the optical base component.

* * * * *